United States Patent [19]

Napier et al.

[11] Patent Number: 4,711,039
[45] Date of Patent: Dec. 8, 1987

[54] FLUIDIZED BEDS

[75] Inventors: Brian A. Napier, Evesham; Maurice J. Fisher, Upton upon Severn, both of England

[73] Assignee: Coal Industry (Patents) Limited, United Kingdom

[21] Appl. No.: 923,268

[22] Filed: Oct. 27, 1986

[30] Foreign Application Priority Data

Nov. 12, 1985 [GB] United Kingdom ............... 8527860

[51] Int. Cl.⁴ ............................................. F26B 17/10
[52] U.S. Cl. ................................. 34/57 A; 34/57 B; 34/168; 432/58
[58] Field of Search ............... 34/57 A, 10, 168, 57 B; 432/15, 58

[56] References Cited

U.S. PATENT DOCUMENTS

| 4,330,502 | 5/1982 | Engstrom | 34/57 A |
| 4,357,883 | 11/1982 | Comparato et al. | 34/57 A |
| 4,397,102 | 8/1983 | Gamble | 34/57 A |

FOREIGN PATENT DOCUMENTS

| 721288 | 1/1955 | United Kingdom . |
| 775393 | 5/1957 | United Kingdom . |
| 1349110 | 3/1974 | United Kingdom . |
| 1402543 | 8/1975 | United Kingdom . |
| 1431763 | 4/1976 | United Kingdom . |
| 1433483 | 4/1976 | United Kingdom . |
| 2143147A | 2/1985 | United Kingdom . |

Primary Examiner—Larry I. Schwartz
Attorney, Agent, or Firm—Stevens, Davis, Miller & Mosher

[57] ABSTRACT

Fluidized bed apparatus includes a body having located therein a distributor provided with discharge ports connected to classifiers. Plates are located over the ports and air lances are disposed intermediate the plates and the ports. The plates serve to protect inbed tubing from erosion by entrained particles and the lances control the flow of material into the classifiers.

6 Claims, 2 Drawing Figures

FLUIDIZED BEDS

This invention covers improvements in or relating to fluidised beds.

In particular, the present invention has reference to the classification of particulate material within a fluidised bed during the operation thereof. It is already known, for example from assignee's published co-pending U/K Application No. 2143 148A (Case 4600), to provide an air classifier for use in association with a fluidised bed for the purpose of separating large ash particles from those of an acceptable size and returning the latter to the fluidised bed. It is now the practice for some applications to install the pneumatic classifier as an integral part of the fluidised bed system, but a potential attendant problem is that associated with erosion effects of the classifier air stream upon inbed tubing. It will be appreciated that within the classifier the particles of acceptable size are entrained in the spouting classifying air and recycled directly into the bed, those oversize particles gravitating out of the air stream for collection and subsequent disposal. The impingement of entrained particles upon the heat exchange tubing can give rise to erosion problems. An object of the invention is to provide an improved arrangement for fluidised bed material classification.

Accordingly the invention provides fluidised bed apparatus including a body adapted to contain a fluidised bed of particulate material supported by a gas permeable distributor, inlet means for fluidising gas, at least one discharge port associated with the distributor, a deflector plate disposed in spaced relation above the discharge port, gas ejection means associated with the discharge port, a classifier connected to the discharge port, and an inlet to the classifier for classifying air.

The fluidised bed apparatus may be in the form of a combustor and the gas permeable distributor may comprise an apertured plate with perforated standpipes registering with the apertures, in use the fluidising gas issuing into the bed through the perforations.

Conveniently a plurality of discharge ports is provided in association with the distributor, preferably therein, each port being connected to a classifier and a deflector plate being disposed above each port.

Advantageously, the ejector means may comprise a number of lances for each discharge port, the lances being situated intermediate the plate and the port. The gas ejector means may be supplied by air which may conveniently be provided from the fluidising air, for example from standpipes adjacent the discharge ports.

By way of example, two embodiments of fluidised bed apparatus according to the invention are described below with reference to the accompanying drawings in which.

Figure 1:
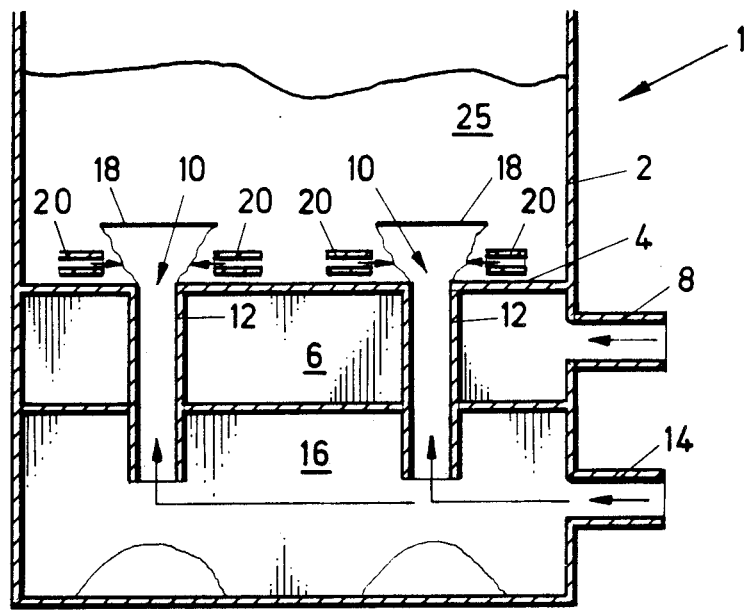
FIG. 1 is a diagrammatic Cross-sectional view of a first embodiment.

With reference to FIG. 1, fluidised bed apparatus 1 includes a body 2 having a distributor 4 beneath which is defined a plenum 6 with an inlet 8 for fluidising air. The distributor 4 is of the type having a plurality of perforated standpipes (not shown), and is provided with a plurality of discharge ports 10 (only two of which are shown) connecting with air classifiers 12 to which air is supplied through an inlet 14 in an ash reception zone 16 beneath the plenum 6.

A plate 18 is disposed in spaced relation above each port 10 and ejector means in the form of air lances 20 are arrayed around and directed towards the port 10 intermediate the plate 18 and the port 10. In this first embodiment a separate air supply is provided for the air lances.

In operation, a fluidised bed 25 is established in the body 2, fluidising air flowing through the distributor 4 from inlet 8 and plenum 6. Fuel, for example coal, is fed to the bed 25 for combustion therein once the temperature of the bed has reached an appropriate level. The bed may be preheated by hot fluidising gas or by above-bed burners. During the combustion of coal, ash particles are formed and some can be of such a size as to be incompatible with the rest of the material in the fluidised bed. The bed material thus requires classification and to this end material descends through ports 10 into classifiers 12 in which flows a rising air current from inlet 14. Oversize particles drop through the air current and are deposited in zone 16 for subsequent removal, whereas particles of an acceptable size are entrained in the ascending air current and thus carried back into the bed. The plates 18 above the ports 10 serve as a protection to inbed heat exchange tubing (not shown) such that impingement thereon is prevented, the entrained particles being deflected by the plates. The air lances 20 are operated to initiate movement into the classifiers 12 of bed material which may form a natural angle of repose around the plates 18. The air lances 20 provide an individual control for each classifier 12 and also ensure particle flow thereto.

Figure 2:
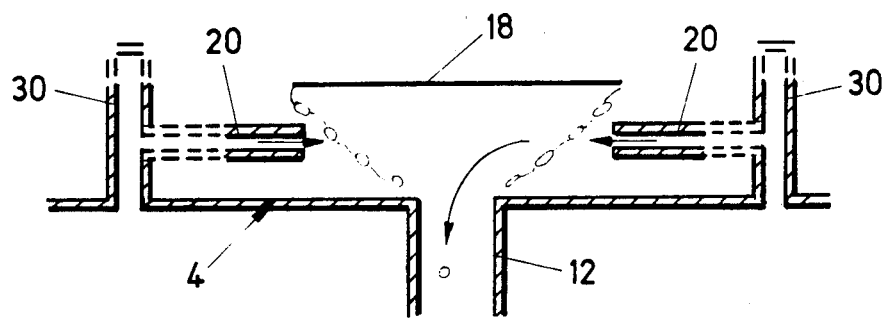
FIG. 2 is a diagrammatic Cross-sectional view of a second embodiment.

Referring now to FIG. 2, like parts have been given like numerals of reference as those in FIG. 1, certain parts of the fluidised apparatus having been omitted in FIG. 2 for the sake of clarity. In this second embodiment, the standpipes 30 of the distributor 4 are shown and the air lances 20 for each classifier 12 (only one of which is shown) are teed into adjacent standpipes and thus derive their air supply from the fluidising air. In operation, therefore, the air lances 20 can only operate when the bed is being fluidised which can be of advantage since particle flow to the classifiers 12 would cease automatically upon the slumping of the bed thereby preventing loss of bed material through the ports 10 and into the classifiers 12.

We claim:

1. Fluidised bed apparatus including a body adapted to contain a fluidised bed of particulate material supported by a gas permeable distributor, inlet means for fluidising gas, at least one discharge port means associated with the distributor, a deflector plate disposed in spaced relation above the discharge port means, a gas ejector means associated with the discharge port means, a classifier connected to the discharge port means, and an inlet means to the classifier for classifying air.

2. Apparatus according to claim 1 in which a plurality of discharge port means is provided, each port means being connected to a classifier and a deflector plate being disposed above each port means.

3. Apparatus according to claim 1 in which the ejector means comprises a number of lances for and directed toward the or each discharge port means, the lances being situated intermediate the plate and the port means.

4. Apparatus according to claim 1 in which the ejector means are air operated and in use are supplied from a source separate from that of the fluidising or classifying air.

5. Apparatus according to claim 1 in which the ejector means are air operated and in use are supplied from the fluidising air.

6. Apparatus according to claim 5 in which the distributor has a plurality of perforated standpipes through which, in use, fluidising gas is introduced into the fluidised bed, and the ejector means are connected into standpipes adjacent the discharge port means.

* * * * *